US009285962B2

(12) United States Patent
Altwasser (10) Patent No.: US 9,285,962 B2
(45) Date of Patent: Mar. 15, 2016

(54) DISPLAY WITH SHARED CONTROL PANEL FOR DIFFERENT INPUT SOURCES

(75) Inventor: Richard Altwasser, Lancashire (GB)

(73) Assignee: Promethean Limited (GB)

( * ) Notice: Subject to any disclaimer, the term of this patent is extended or adjusted under 35 U.S.C. 154(b) by 556 days.

(21) Appl. No.: 13/807,406

(22) PCT Filed: Jun. 29, 2011

(86) PCT No.: PCT/EP2011/060898
§ 371 (c)(1),
(2), (4) Date: Apr. 18, 2013

(87) PCT Pub. No.: WO2012/001037
PCT Pub. Date: Jan. 5, 2012

(65) Prior Publication Data
US 2013/0198675 A1 Aug. 1, 2013

(30) Foreign Application Priority Data
Jun. 29, 2010 (GB) .................................. 1010942.9

(51) Int. Cl.
G06F 3/048 (2013.01)
G06F 3/0484 (2013.01)
G06F 3/041 (2006.01)
G06F 3/046 (2006.01)
G06F 3/0481 (2013.01)
G06F 3/0488 (2013.01)

(52) U.S. Cl.
CPC .............. *G06F 3/0484* (2013.01); *G06F 3/046* (2013.01); *G06F 3/0416* (2013.01); *G06F 3/04817* (2013.01); *G06F 3/04886* (2013.01); *G06F 2203/0382* (2013.01)

(58) Field of Classification Search
None
See application file for complete search history.

(56) References Cited

U.S. PATENT DOCUMENTS

| 6,204,837 | B1* | 3/2001 | Smith | G06F 3/038 345/156 |
| 2005/0198578 | A1* | 9/2005 | Agrawala | G06F 9/4443 715/750 |
| 2008/0284751 | A1* | 11/2008 | Hsu | G06F 3/0416 345/173 |
| 2008/0291174 | A1* | 11/2008 | Mazeev | G06F 3/023 345/173 |

(Continued)

FOREIGN PATENT DOCUMENTS

| EP | 0 762 319 A2 | 3/1997 |
| EP | 2 071 436 A1 | 6/2009 |
| WO | WO 2008/044024 A2 | 4/2008 |

OTHER PUBLICATIONS

International Search Report prepared by the European Patent Office on Sep. 2, 2011, for International Application No. PCT/EP2011/060898.
Combined Search and Examination Report by the Great Britain Intellectual Property Office on Oct. 25, 2010 for Great Britain Application No. 1010942.9.

(Continued)

*Primary Examiner* — Matt Kim
*Assistant Examiner* — Hua Lu
(74) *Attorney, Agent, or Firm* — Brient Globerman, LLC; Kyle M. Globerman (57) ABSTRACT

A computer system associated with a display and for receiving control inputs from at least two separately identifiable input sources, and adapted to display a shared control panel for the input sources, the shared control panel being associated with an application running on the computer system, the computer system being further adapted to allocate a functionality to one of the identifiable input sources in response to a selection of a function displayed in the shared control panel by said identifiable input source.

14 Claims, 7 Drawing Sheets

(f)

(56) References Cited

U.S. PATENT DOCUMENTS

2009/0085871 A1* 4/2009 Bhogal ................ G06F 3/0483
345/163
2011/0021271 A1* 1/2011 Ikeda ..................... A63F 13/06
463/30

OTHER PUBLICATIONS

Written Opinion for International (PCT) Patent Application No. PCT/EP2011/060898 dated Sep. 2, 2011, 6 pages.

International Preliminary Report on Patentability for International (PCT) Patent Application No. PCT/EP2011/060898 mailed Jan. 17, 2013, 8 pages.

* cited by examiner

DISPLAY WITH SHARED CONTROL PANEL FOR DIFFERENT INPUT SOURCES

BACKGROUND TO THE INVENTION

1. Field of the Invention

The present invention relates to a computer system associated with a display, and configured to receive control inputs from a plurality of input sources, and further adapted to display on the display a shared control panel for the plurality of input sources, the shared control panel being associated with an application running on the computer system.

2. Description of the Related Art

Software applications that expose a graphical user interface (GUI) are designed to be interacted with via a single input source, such as a mouse input. When a user has to select one tool from a range of mutually exclusive tools on a toolbar, it is therefore sufficient to show one of the tools in a highlighted or selected state within the GUI, with all other tools being shown in a non-highlighted or non-selected state.

It is also known in the art for computer systems to receive inputs from multiple input sources. For example a keyboard and a mouse may be considered as two separate input sources. In more sophisticated systems, multiple mouse devices may be provided, each mouse device constituting a separate input source.

Moreover, in the field of interactive systems having interactive display surfaces, particularly such interactive systems incorporated within systems such as electronic whiteboards, it has been proposed to allow for the processing of multiple detected inputs at the interactive surface. In a more recent development, it is proposed to allow for the detection of multiple inputs at an interactive surface, which inputs are detected using different types of input detection technology. It is known in the art to provide interactive surfaces which are touch-sensitive, and to provide interactive surfaces which are adapted to detect the presence of a specially adapted pen (such as by electromagnetic means). In a proposal for an interactive surface in an electronic whiteboard application, the interactive surface is adapted to detect touch inputs and pen inputs. Each input type may be considered a distinct input source.

In the proposals for an interactive surface of an interactive display system it is further proposed for each input type, i.e. pen or touch, to be able to select a different tool within an application running on the computer system.

Moreover, it is desirable that even different input sources of the same type may be able to select different tools and control an application in different ways. For example an interactive system may be able to distinguish between inputs from two different pens, based on different operating frequencies of the pens.

In order to address this problem, it has been proposed by Promethean Limited to provide each identifiable pen with a toolbox specific to that pen. Thus the tool currently associated with a specific pen is highlighted within a pen-specific toolbox.

Whilst this solution has particular advantages in certain applications, it requires software applications configured for single-input applications to be specially adapted, and also means that less of the display area is available for use by the software application, the presence of multiple toolboxes for each input source consuming the usable display area. For this reason, in certain applications it would be advantageous to maintain a shared toolbox for multiple input sources, rather than provide each input source with a separate toolbox.

A problem then arises in the prior art, in that known GUIs are implemented with toolbars which are adapted to allow selection and highlighting of one tool at a time. When utilised in a multi-input environment, a shared toolbox allows only for the same function to be allocated to all inputs. When one input is used to select a function in the shared toolbox, all inputs then have that function. Thus a function must be selected (or reselected) each time an input is used, to ensure a desired functionality is always associated with the input when it is used.

It is an object of the invention to address one or more of the above-stated problems, and provide an improvement in a computer system associated with a display for receiving control inputs from a plurality of input sources, and adapted to display a shared control panel for the plurality of input sources, the shared control panel being associated with an application running on the computer system.

SUMMARY OF THE INVENTION

The invention provides a computer system associated with a display and for receiving control inputs from at least two separately identifiable input sources, and adapted to display a shared control panel for the input sources, the shared control panel being associated with an application running on the computer system, the computer system being further adapted to allocate a functionality to one of the identifiable input sources in response to a selection of a function displayed in the shared control panel by said identifiable input source.

The computer system may be further adapted to store an association of input sources with functions, wherein in dependence on a function being allocated to an input source the stored association is updated.

The computer system may be further adapted to apply the function allocated to an input source responsive to detection of an input from the input source.

The input source may be uniquely identifiable, the computer system being configured to allocate the functionality to said single input source.

The input source may be identifiable as being of a particular type, the computer system being configured to allocate the functionality to all input sources of that type.

The computer system may be further configured to display on the display an association of the plurality of input sources with one or more displayed items of the displayed shared control panel, being indicative that each of the plurality of input sources are associated with a function represented by the one or more displayed items.

In accordance with another aspect of the invention there is provided a computer system associated with a display and for receiving control inputs from at least two separately identifiable input sources, and adapted to display a shared control panel for the sources, the shared control panel being associated with an application running on the computer system, the computer system further adapted to display on the display an association of the input sources with one or more displayed items of the displayed shared control panel, being indicative that each of the input sources are associated with a function represented by the one or more displayed items.

Preferably the input sources are of a different type. Preferably the input sources comprise a touch-type input source and a pen-type input source. The pen-type input source preferably includes an electromagnetic means adapted to interact with electromagnetic means in the interactive surface. The touch-type input preferably comprises a finger or hand.

Preferably the shared control panel includes a first display area identifying a first input source, and functions—or parameters associated with functions—allocated to the first input source, and a second display area identifying a second input source, and functions—or parameters associated with functions—allocated to the second input source.

The association of an input source with a displayed item in the shared control panel may indicate a function of the software application currently associated with the input source.

Each displayed item of the shared control panel may indicate whether any of the input sources are currently associated therewith.

At least one input source may be associated with an identifiable input device at the surface, the association of the input source including the identity of the associated input device.

A function represented by the displayed item is applied on detection of an input from an associated input source.

The identity of the input source may identify the type of the input source. The identity of the input source may uniquely identify the input source.

The association may be displayed in the displayed item. The association may be displayed in the shared control panel.

The association may be displayed by displaying a representation of the input source in association with a representation of a selected item.

The display may be provided on an interactive display surface adapted to detect a plurality of contact points thereon, each of the plurality of contact points being associated with one of a plurality of input sources.

Any contact point may be detected by one or more of an electromagnetic means; a camera means; a touch sensitive means; or a pressure sensitive means.

The invention further provides a displayed shared control panel associated with an application running on a computer system, which application is adapted to be controlled by control inputs from at least two separately identifiable input sources, the displayed shared control panel being adapted to display an association of the input sources with one or more control functions of the shared control panel, the association indicating the control functions of the shared control panel allocated to each of the input sources.

The invention also provides a method for controlling a display of a computer system for receiving control inputs from at least two separately identifiable input sources, comprising displaying a shared control panel for the input sources, the shared control panel being associated with an application running on the computer system, allocating a functionality to one of the identifiable input sources responsive to a selection of a function displayed in the shared control panel by said identifiable input source.

The method may further comprise storing an association of input sources with functions, wherein in dependence on a function being allocated to an input source the stored association is updated.

The method may further comprise applying the function allocated to an input source responsive to detection of an input from the input source.

The method may further comprise displaying on the display an association of the plurality of input sources with one or more displayed items of the displayed shared control panel, being indicative that each of the plurality of input sources are associated with a function represented by the one or more displayed items.

The invention still further provides a method for controlling a display of a computer system for receiving control inputs from at least two separately identifiable input sources, comprising displaying a shared control panel for the input sources, the shared control panel being associated with an application running on the computer system, displaying on the display an association of the input sources with one or more displayed items of the displayed shared control panel, being indicative that each of the input sources are associated with a function represented by the one or more displayed items.

At least one input source may be associated with an identifiable input device at the surface, the association of the input source including displaying the identity of the associated input device.

The method may further comprise displaying the association in the displayed item. The method may further comprise displaying the association in the shared control panel. The method may further comprise displaying a representation of the input source in association with a representation of a selected item.

The invention also provides a computer program adapted to perform any defined method. The invention also provides a computer program product adapted to store computer code which, when run on a computer, performs any defined method.

The invention further comprises an interactive display system including a computer system as defined.

BRIEF DESCRIPTION OF THE FIGURES

The invention will now be described by way of example with reference to the accompanying figures, in which.

DESCRIPTION OF THE PREFERRED EMBODIMENTS

The invention is now described by way of reference to various examples, embodiments, and advantageous applications. One skilled in the art will appreciate that the invention is not limited to the details of any described example, embodiment or detail. In particular the invention is described with reference to an exemplary interactive display system. One skilled in the art will appreciate that the principles of the invention are not limited to such a described system.

A typical example of an interactive display system is an electronic whiteboard system. An electronic whiteboard system typically is adapted to sense the position of a pointing device or pointer relative to a work surface (the display surface) of the whiteboard, the work surface being an interactive surface. When an image is displayed on the work surface of the whiteboard, and its position calibrated, the pointer can be used in the same way as a computer mouse to manipulate objects on the display by moving a pointer over the surface of the whiteboard.

A typical application of an interactive whiteboard system is in a teaching environment. The use of interactive whiteboard systems improve teaching productivity and also improve student comprehension. Such whiteboards also allow use to be made of good quality digital teaching materials, and allow data to be manipulated and presented using audio visual technologies.

A typical construction of an electronic whiteboard system comprises an interactive display forming the electronic whiteboard, a projector for projecting images onto the display, and a computer system in communication with the electronic whiteboard for generating the images for projection, running software applications associated with such images, and for processing data received from the display associated with pointer activity, such as the location of the pointer on the display surface. In this way the computer system can control the generation of images to take into account the detected presence of the pointer on the interactive surface.

Figure 1:
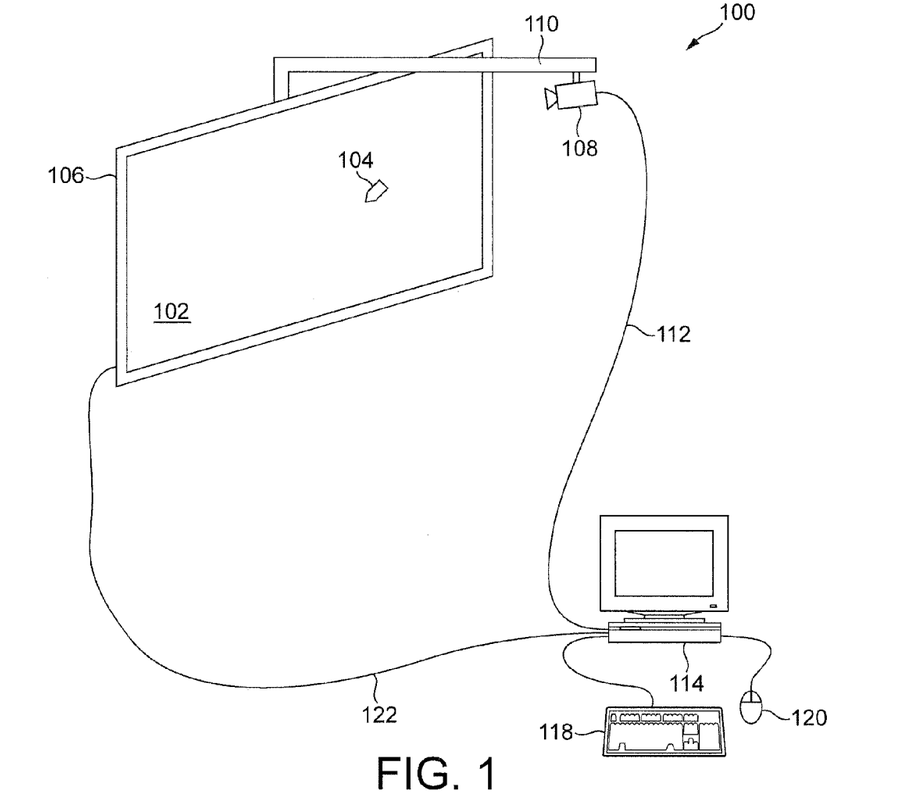
FIG. 1 illustrates the main elements of a typical known example interactive display system.

With reference to FIG. 1, an exemplary interactive display system 100 comprises: a whiteboard assembly arrangement generally designated by reference numeral 106, and including an interactive display surface 102; a projector 108, and a computer system 114. The projector 108 is attached to a fixed arm or boom 110, which extends in a direction perpendicularly from the surface of the whiteboard 106. One end of the boom 110 supports the projector 108 in a position in front of the display surface 102, and the other end of the boom 110 is fixed to the whiteboard 106 or near the whiteboard, such as a frame associated with the whiteboard 106, or a wall on which the whiteboard 106 is mounted.

The computer 114 controls the interactive display system. A computer display 116 is associated with the computer 114. The computer 114 is additionally provided with a keyboard input device 118 and a mouse input device 120. The computer 114 is connected to the whiteboard 106 by communication line 122 to receive input data from the display surface 102, and is connected to the projector 108 by a communication link 112 in order to provide display images to the projector 108. Although in FIG. 1 these are shown as wired connections, they also may be implemented as wireless connections.

Shown in FIG. 1 is a pointing device 104, which is used to provide inputs at the display surface 102. In other interactive display systems the display surface 102 may be a touch-sensitive surface, and inputs provided at the interactive display surface by touch using a finger. Various technologies exist for detecting the position of a pointing device (such as a pen or finger) at the interactive surface, which additionally include camera position detection technology. The invention encompasses all such technologies and is generally applicable to interactive surfaces.

As is known in the art, the computer 114 controls the interactive display system to project images via the projector 108 onto the interactive display surface 102. The position of the pointing device 104 is detected by the interactive display surface 102, data returned to the computer 114, and location information determined by the computer 114. The pointing device 104 operates in the same way as a mouse to control the displayed images.

Figure 2:
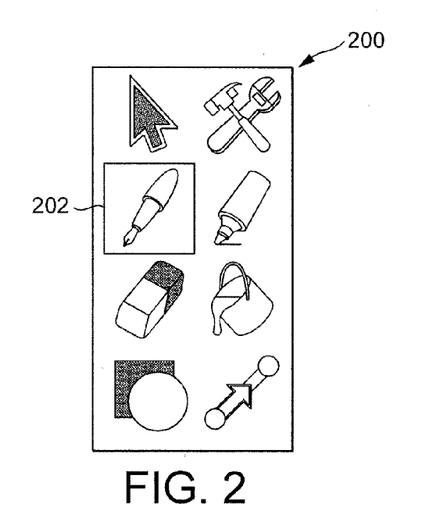
FIG. 2 illustrates the highlighting of a toolbox selection as known in the art.

With reference to FIG. 2 there is illustrated an example control panel 200, being representative of a control panel which is displayed on the interactive surface 102 in association with a software application which is running on the computer 114. The control panel 200 includes a plurality of displayed items. In the illustrated example the control panel 200 is a tool bar or tool box, and the displayed items are graphical representations of tool functions or tool settings, referred to as tools.

As known in the art, one of the displayed tools of the toolbar 200, denoted by reference numeral 202 in FIG. 2, is in a highlighted state, meaning that a function associated with the tool 202 is currently applied to the pointing device 104.

Figure 3:
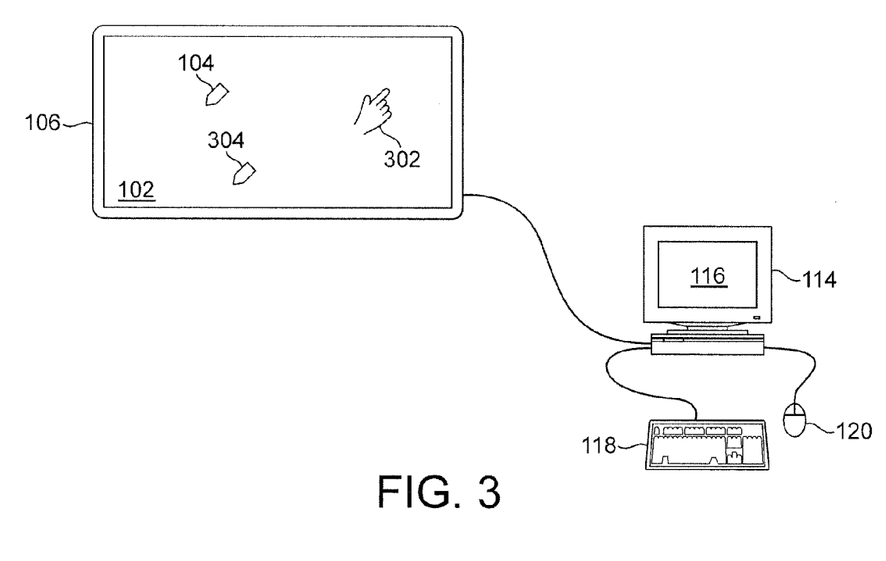
FIG. 3 illustrates the main elements of an improved interactive display system.

With reference to FIG. 3, there is illustrated an alternative interactive display system to that of FIG. 1, which is improved in accordance with improvements in the art to allow multiple inputs at the interactive surface, and moreover to allow multiple inputs from different input sources and/or from different types of input source.

In the following description, it is assumed that the interactive display system is deployed in an educational environment. In such an environment, the teacher has control of the mouse 120 and the keyboard 118 in order to have overall control of the interactive display system. A teacher may also use the pointing device 104. However in the embodiments described herein it is assumed that a student has control of the pointing device 104. It is also envisaged that a plurality of pointing devices such as pointing device 104 may be provided, which may be used on the interactive surface 102 simultaneously by a number of different students.

It will be understood by one skilled in the art, however, that the invention and its embodiments are not limited to application in an educational environment. One skilled in the art will envisage other possible applications.

The interactive display system 100 of FIG. 1 is shown as being adapted in FIG. 3 to include an additional pointing device 304 operating at the interactive surface 102, as well as a hand providing finger inputs as denoted by reference numeral 302 at the interactive surface 102. Pointing devices 104 and 304 represent two input sources of the same type, and touch input 302 represents a further input source of a different type.

An input source of a variety of types may be provided. Examples of input source types include those, as described herein, that interact with an interactive surface. Further examples of input sources include mouse devices and keyboards. The invention is not limited to inputs at an interactive surface, although it has advantages in such an environment. The invention is applicable to any environment in which a plurality of input sources are provided. The invention does not require the input sources to be of different types—it is required that the inputs from at least two different input sources can be distinguished, and this may be achieved for different input sources of the same type. However where the input sources are of different types, then they may be any type of input source in combination. In general, the invention requires that a computer system is adapted to detect inputs from at least two separately identifiable (or distinguishable) input sources.

The invention is described in the following embodiments in the context of an interactive display system including an interactive surface which is adapted to detect inputs from input sources comprising pen-type devices, and also inputs from input sources comprising touch inputs. However the invention is not limited to such scenarios, and is generally directed towards a computer system, preferably but not necessarily including an interactive surface, in which multiple inputs can be detected from multiple input sources, regardless of whether the various input sources are of the same or different types, and in which at least two input sources are separately identifiable.

In accordance with the invention, the computer system of the exemplary interactive display system is configured to allocate a functionality to one of at least two identifiable input sources in response to a selection of a function, represented by a displayed image or icon in a shared control panel, by the one identifiable input.

The selected functionality is preferably allocated to the identifiable input source for an application session, unless changed by selection of another function by the identifiable input source.

The allocation of a function to one identifiable input source preferably does not affect the function allocated to a different identifiable input source. Thus on allocating a functionality to one of at least two identifiable input sources, the functionality is not allocated to the other identifiable input source.

An input source may be identifiable by its type, e.g. touch, pen, mouse, keyboard etc. An input source may be uniquely identifiable, e.g. by the frequency associated with a pen.

Thus for example, when a touch input is used to select a particular function from a shared toolbox, that function is allocated to a touch input. When a touch input is detected on the interactive surface, the allocated function is applied at the detected contact point. When a pen input is used to select a particular function from a shared toolbox, that function is allocated to the pen input, but the function allocated to touch inputs is unchanged.

The computer system is preferably further adapted to store an association of input sources with functions. In dependence on a function being allocated to an input source the stored association is updated. Table 1 illustrates an exemplary storage of associations:

TABLE 1

| INPUT SOURCE TYPE | INPUT SOURCE IDENTITY | FUNCTION |
|---|---|---|
| TOUCH | (NOT APPLICABLE) | DRAW |
| PEN | (NOT APPLICABLE) | ANNOTATE |
| PEN | PEN #1 | YELLOW MARKER |
| PEN | PEN #2 | ERASER |

In the example of Table 1, all touch input source types are allocated a common functionality. Specific, uniquely identifiable pen input types (i.e. Pen #1 and Pen #2) are allocated specific functions. All other pen input sources are allocated a common functionality.

Functionality may be allocated to an input source according to its type, or allocated to a uniquely identifiable input source.

The computer system is preferably further adapted to apply the function allocated to an input source responsive to detection of an input from the input source.

In accordance with embodiments of the invention, further improvements are made to a graphical user interface in implementing the principles of the invention, as discussed further hereinbelow.

Figure 4:
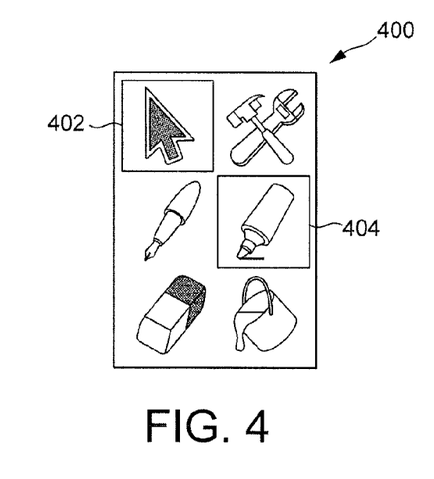
FIG. 4 illustrates the deficiencies with highlighting a toolbox selection in the improved interactive display system of FIG. 3.

With reference to FIG. 4, there is illustrated an exemplary shared control panel 400, comprising a shared toolbox, which may be displayed on a display on the interactive surface 102 in conjunction with the software application running under the control of the computer 114. In accordance with the invention as described hereinabove different identifiable input sources may select functions to be allocated thereto by selecting displayed icons on the shared toolbox representing a desired function.

In accordance with prior art techniques, as denoted in FIG. 2, a tool of the shared toolbox 400 is highlighted to indicate selection by an input source. In the example described, it is assumed that one pen-type device such as device 104 is in operation, and one finger input device such as finger 302 is in operation. Thus two input sources are operational on the interactive surface. One of the devices, such as pen-type device 104 has selected the tool denoted by the graphical icon 402, and the other input device such as finger 302 has selected the tool as represented by the graphical icon 404. Utilising prior art techniques, each of the graphical icons 402 and 404 are highlighted to illustrate selection.

However it can be understood by reference to FIG. 4, that a problem arises insofar as that it is not possible to identify which of the two input sources has selected which of the two highlighted tools 402 and 404 of the shared toolbox.

In accordance with embodiments of the invention this problem is overcome by further adapting the computer system to display on the display an association of the input sources with one or more displayed items of the displayed shared control panel, being indicative that each of the input sources are associated with a function or parameter represented by the one or more displayed items.

The association of an input source with a displayed item in the shared control panel indicates a function of the software application currently associated with the input source. Each displayed item of the shared control panel indicates whether any of the input sources are currently associated therewith.

With reference to FIGS. 5(a) to 5(g), there are illustrated improvements obtained in accordance with the invention in various embodiments. In FIGS. 5(a) to 5(g), it is assumed that there are two input sources of different types operating at the interactive surface, one being of a pen-type and the other being of a touch-type. As such, the shared control panel is adapted to display with an item of the shared control panel an indication as to which type of input source is currently associated with the displayed item of the shared control panel.

Figure 5A:
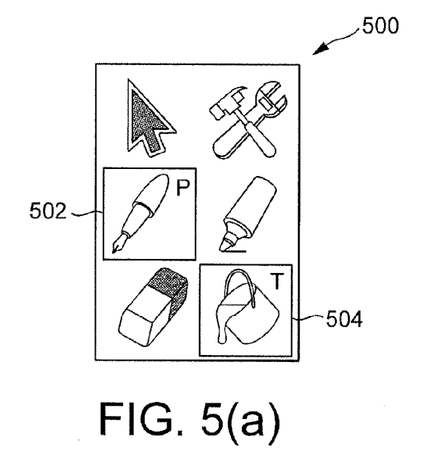
FIGS. 5(a) to (g) illustrates the highlighting of toolbox selections in the improved interactive display system of FIG. 3 in accordance with embodiments of the invention.

FIG. 5(a) illustrates an example in which the shared control panel 500 is adapted to display an indication of the type of input source currently associated with a particular displayed item of the shared control panel. With the pen-type device 104 selecting the item 502, an annotation "P" is displayed within or proximate the item. With the touch-type input selecting the function associated with the item 504, a "T" annotation is displayed within or proximate the item 504.

Figure 5B:
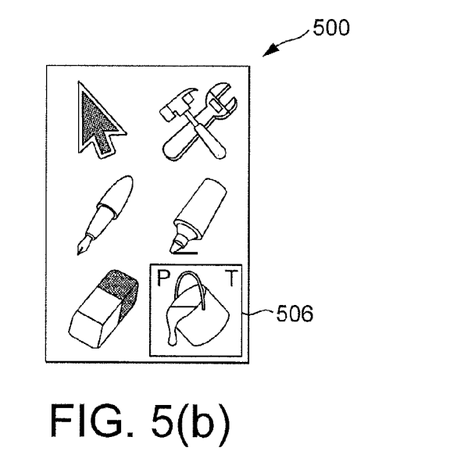

With reference to FIG. 5(b), there is illustrated an exemplary modification of the shared control panel 500 when both input sources select the same item of the shared control panel. An item 506 has been selected by both the pen 104 and the finger 302, and hence this item is annotated with both "P" and "T" within or proximate the item 506.

Figure 5C:
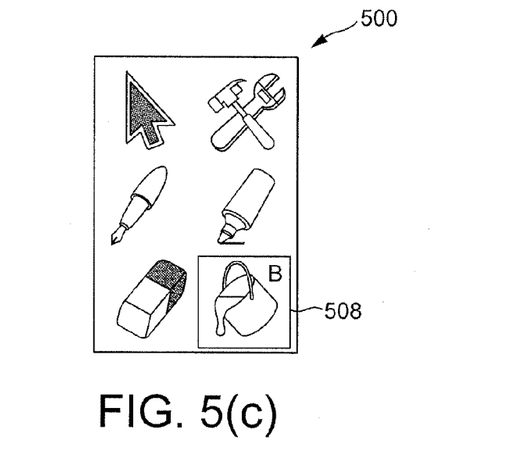

FIG. 5(c) illustrates an alternative to FIG. 5(b), as a way of representing an item having been selected by both types of input device. In this example an item 508 selected by both the pen 104 and the finger 302 is annotated with "B" within or proximate the item 508, to indicate that both input sources have selected it.

Figure 5D:
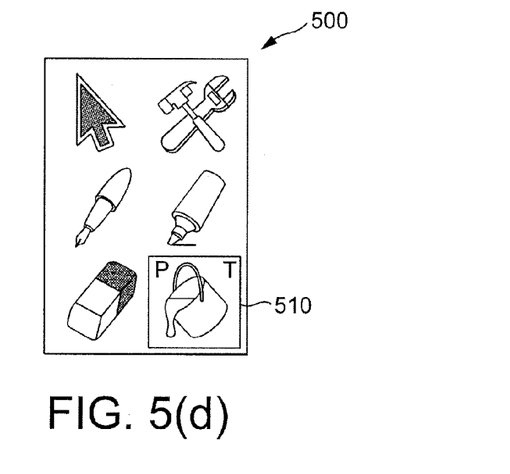

FIG. 5(d) represents a further alternative to the arrangement of FIG. 5(b), as a way of representing a selection of a particular item by both devices. In the example of FIG. 5(d), the selection of item 510 simply results in the item being highlighted, without indication of any type of device. In such an arrangement the display of FIG. 5(a) may be used to illustrate selection of a displayed item by one input device, and the display of FIG. 5(d), showing no annotations, is used to illustrate selection of an item by both input devices.

One skilled in the art will appreciate that other possibilities exist for displaying the selection. Rather than using the annotations "P" or "T", small pen or finger icons may be displayed within or proximate the selected item. In addition, different coloured highlighting could be used to show the association of an item to a particular input source.

In an arrangement in which the input detection technology allows for the identification of different input sources of the same type, such as where the input sources are provided by pen-type devices which are adapted to transmit/receive at different frequencies, the items within the shared control panel may be adapted to display the identity of the input device with which they are associated. Thus at least one input source may be associated with an identifiable input device at the surface, and the indication of the input status may include the identity of the associated input device in the shared control panel.

Figure 5E:
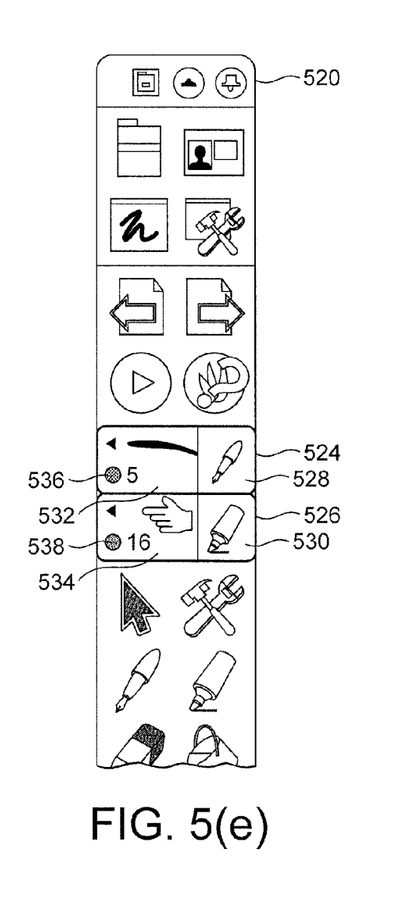

FIG. 5(e) illustrates a further example, in which a shared control panel 520 is adapted to display an indication of the functions or items currently allocated to an input source. Thus within a highlighted portion 524 of the shared control panel 520 there is illustrated an icon 532 representing a pointing device. Within the item 524 there is also illustrated a pen icon 528, a particular colour icon 536, and a pen width indicator (pen width 5). Thus all functions or parameters allocated to the pointing device in use at the interactive surface are displayed within the menu item 524, in combination with an icon illustrating the pointing device.

Similarly a menu item 526 is provided having an icon 534 representing a touch input. Also shown is a marker pen icon 530, a colour icon 538, and a pen width indicator (pen width 16 in the example). Thus the item 526 illustrates the functions or parameters associated with the touch input, as represented by the touch icon 534 being displayed within the item 526.

Thus as illustrated in FIG. 5(e) rather than a label or icon associated with a particular input source being allocated to a function shown on the shared toolbar, a specific shared toolbar displayed item is provided for the input source, and functions or parameters currently allocated to the input source displayed in that item with the input source. This may be particularly advantageous for certain tools, such as "select" or "erase", where a limited number of tool functions can be selected and therefore minimal space is consumed by the provision of the displayed item.

Figure 5F:
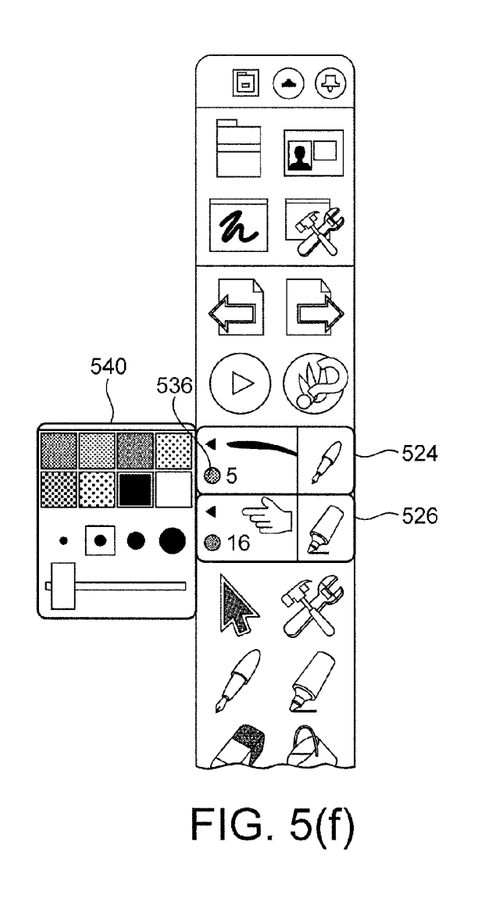

As illustrated in FIG. 5(f), a sub-control panel or sub-menu associated with a function or parameter allocated to the input source may be made available as soon as a "preview" function is selected. Thus as illustrated in FIG. 5(f), a colour icon 536 associated with the pointing device, displayed in the selected item 524, may be selected for preview, which results in a menu 540 being displayed which shows all of the available colours for further selection.

It should be noted that the example as described with reference to FIGS. 5(e) and 5(f) is not limited to an arrangement where a shared control panel is generally presented in a vertical orientation. It may also be implemented in an arrangement in which the shared control panel is presented in a horizontal orientation, or any other configuration.

Figure 5G:
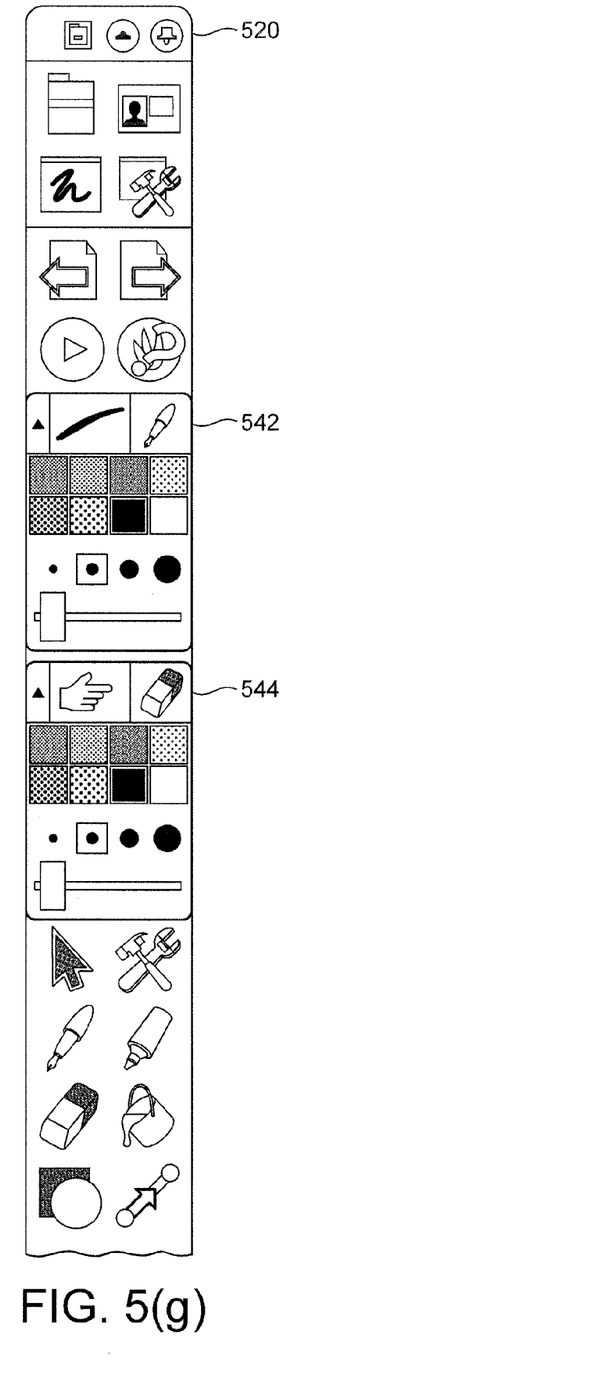

With reference to FIG. 5(g), there is illustrated a further modification to the arrangements of FIGS. 5(e) and 5(f), where the displayed item 524 of FIG. 5(e) is replaced by a displayed item 542 of FIG. 5(g), including the options for varying the parameters selected and associated with the particular input source. Similarly the selected item 526 of FIG. 5(e) is replaced in FIG. 5(g) with a selected item 544, showing all the functions or parameters currently associated with the touch input, and the available options for modifying those parameters.

A function represented by the displayed item is applied on detection of an input from an associated input source at the interactive surface.

The identity of the input source may identify the type of the input source. The identity of the input source may uniquely identify the input source.

Figure 6:
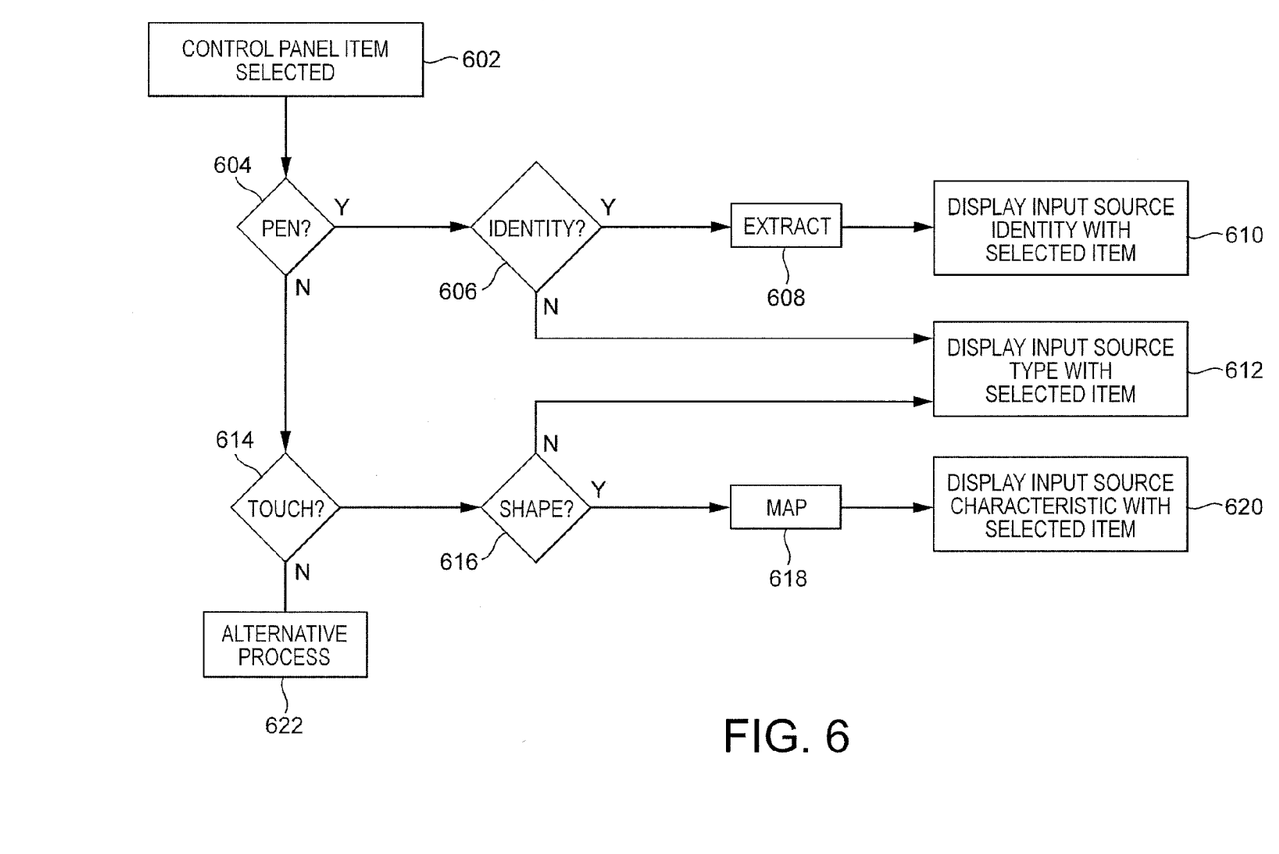
FIG. 6 illustrates an exemplary process in accordance with embodiments of the invention.

FIG. 6 illustrates a process flow in accordance with a preferred embodiment of the invention. In a step 602 a shared control panel item, such as a tool of a shared toolbar, is selected.

In step 604 it is determined if the selection was by an input source comprising a pen. If the determination is positive, then in step 606 it is determined whether an identity of the pen can be retrieved.

In the event that it is determined that a pen identity cannot be retrieved, then in step 612 the display associated with the selected item in the shared control panel is modified to provide an indication of the type of the input source which has been used to select the item, i.e. pen. An association is also made (and stored) between the function associated with the selected item and input sources of the type 'pen'.

In the event that it is determined that a pen identity can be retrieved, then in a step 608 the appropriate processing is performing to derive the identity of the pen, which identity may be a unique identity. Then in step 612 the display associated with the selected item in the shared control panel is modified to provide an indication of the identity of the display input source which has been used to select the item, and optionally the type of input source. An association is also made (and stored) between the function associated with the selected item and the specific input source, e.g. 'pen 1'.

If in step 604 it is determined that the selection was not by a pen, then the process moves on to step 614.

In step 614 it is determined if the selection was by an input source comprising a touch. If the determination is positive, then in step 616 it is determined whether an identity characteristic of the touch can be retrieved. A characteristic of the touch may be the shape of the touch. For example, it may be possible to distinguish between a touch input provided by a finger tip, and a touch input provided by a flat hand. The surface area associated with the touch may be used to determine a characteristic of the touch in this way. This may also allow for objects providing a touch input to be identified.

In an alternative arrangement, it may be possible to identify an identity associated with the touch input.

In the event that it is determined that a touch characteristic cannot be retrieved, then in step 612 the display associated with the selected item in the shared control panel is modified to provide an indication of the type of the display input source which has been used to select the item, i.e. touch. An association is also made (and stored) between the function associated with the selected item and input sources of the type 'touch'.

In the event that it is determined that a touch characteristic can be retrieved, then in a step 618 the appropriate processing is performed to derive the characteristic of the touch, for example by mapping a determined contact surface area to a shape. Then in step 620 the display associated with the selected item in the shared control panel is modified to provide an indication of the characteristic of the display input source which has been used to select the item, and optionally the type of input source. An association is also made (and stored) between the function associated with the selected item and the specific input source, e.g. 'touch 1'.

If in step 614 it is determined that the input is not a touch input, then further or alternate processing may proceed in step 622.

Figure 7:
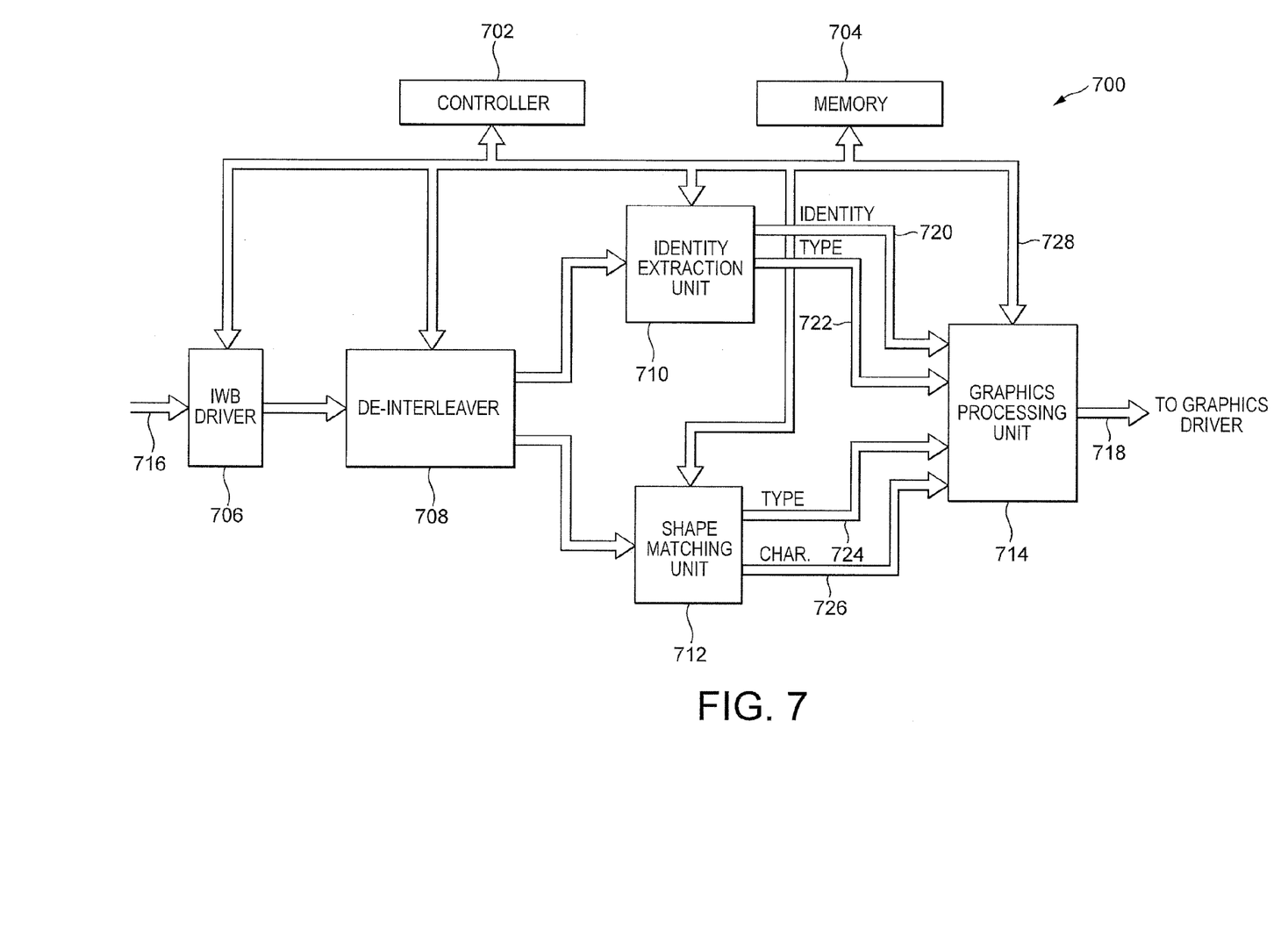
FIG. 7 illustrates an exemplary architecture of a computer system adapted in accordance with embodiments of the invention.

FIG. 7 illustrates the main functional elements required in a computer system to implement the invention and its embodiments. The computer system 700 comprises a controller 702; a memory 704; an interactive whiteboard driver 706; a de-interleaver 708; an identity extraction unit 710; a shape matching unit 712; and a graphics processing unit 714.

All the functional elements are interconnected by a system bus 728. The interactive whiteboard driver 706 receives data from the interactive surface on data input bus 716. The received data is provided to the de-interleaver 708, which de-interleaves the received detected data and provides pen data on a bus to the identity extraction unit 710, and touch data on a bus to the shape matching unit 712.

The identity extraction unit 710 determines if an identity of the pen providing the pen data can be extracted, and if so extracts it. The identity extraction unit 710 then provides the information relating to the type of input source (i.e. pen) on connections 722 to the graphics processing unit 714, and information relating to the identity of the input source (if available) on connections 720 to the graphics processing unit 714.

The shape matching unit 712 determines if a characteristic of the touch providing the touch data can be extracted, and if so matches it. The shape matching unit 712 then provides the information relating to the characteristic of the touch (if available) on connections 726 to the graphics processing unit 714, and information relating to the type of the input source (i.e. touch) on connections 724 to the graphics processing unit driver 714.

The graphics processing unit 714 generates graphics data on graphics data bus 718 for a graphics driver, which controls the displayed images on the interactive surface.

The controller 702 controls the various functional elements, and access to the memory 704, on a control/data bus 728.

The memory 704 stores any associations between input stores and functions, such as the associations as exemplified in Table 1.

It will be understood that the functional elements shown in FIG. 7 do not represent a full implementation of a computer system to control and operate an interactive surface, but represent the main functional blocks required to implement the invention and its embodiments.

The methods described herein may be implemented on computer software running on a computer system. The invention may therefore be embodied as computer program code being executed under the control of a processor of a computer system. The computer program code may be stored on a computer program product. A computer program product may be included in a computer memory, a portable disk or portable storage memory, or hard disk memory.

The invention is described herein in the context of its application to a computer system forming part of an interactive display system. It will be understood by one skilled in the art that the principles of the invention, and embodiments described herein, are not limited to any specific interactive display system. The principles of the invention and its embodiments may be implemented in any interactive display system. The invention and its embodiments is not limited to the use of a pointer or pointing device in combination with an interactive display system, and the invention and its embodiments equally apply to arrangements in which a touch-sensitive touch surface arrangement is provided for the interactive display, or any other type of interactive surface is provided such as one utilising camera technology.

The invention has been described herein by way of reference to particular examples and exemplary embodiments. One skilled in the art will appreciate that the invention is not limited to the details of the specific examples and exemplary embodiments set forth. Numerous other embodiments may be envisaged without departing from the scope of the invention, which is defined by the appended claims.

The invention claimed is:

1. A computer system comprising a processor and a display, the processor configured for: receiving control inputs from a plurality of separately identifiable input sources, displaying a shared control panel for an application running on the computer system, the control panel displaying a plurality of functions for allocation to inputs to the application, receiving an input to the application from at least one of the identifiable input sources, detecting selection of a function of the control panel by the input, allocating the selected function to the at least one identifiable input source, storing an association of the at least one identifiable input source with the selected function, and in dependence on receiving a further input from the at least one identifiable input source, applying the selected function allocated to the identifiable input source.

2. The computer system of claim 1 wherein the input source is uniquely identifiable, the processor being configured to allocate the functionality to said single input source.

3. The computer system of claim 1 wherein the input source is identifiable as being of a particular type, the processor being configured to allocate the functionality to all input sources of that type.

4. The computer system of claim 1 being further configured to display on the display an association of the plurality of input sources with one or more displayed items of the displayed shared control panel, being indicative that each of the plurality of input sources are associated with a function represented by the one or more displayed items.

5. The computer system of claim 4 wherein the association of an input source with a displayed item in the shared control panel indicates a function of the software application currently associated with that input source.

6. The computer system of claim 4 wherein each displayed item of the shared control panel indicates whether any of the input sources are currently associated therewith.

7. The computer system of claim 4 wherein the association is displayed in the shared control panel.

8. The computer system of claim 1 wherein the association is displayed by displaying a representation of the input source in association with a representation of a selected item.

9. The computer system of claim 4 wherein the display is provided on an interactive display surface adapted to detect a plurality of contact points thereon, each of the plurality of contact points being associated with one of a plurality of input sources.

10. The computer system of claim 1 wherein the input source is identifiable as being of a particular type, the processor being configured to allocate the functionality of all input sources of that type and being further configured to display on the display an association of the plurality of input sources with one or more displayed items of the displayed shared control panel, being indicative that each of the plurality of input sources are associated with a function represented by the one or more displayed items in which the association of the input source includes the unique identity of the associated input device.

11. A computer-implemented method for controlling a computer system comprising: providing an application running on the computer system; receiving, by a processor, control inputs for the application from at least two separately identifiable input sources; displaying, by a processor, a shared control panel for the application on a display of the computer system, the control panel displaying a plurality of functions for allocation to inputs to the application; receiving, by a processor, an input at the application from at least one of the identifiable input sources; detecting, by a processor, selection of a function of the control panel by the input; allocating, by a processor, the selected function to the at least one identifiable input source; storing, by a processor, an association of the at least one identifiable input source with the selected function; and in dependence on receiving a further input from the at least one identifiable input source, applying, by a processor, the stored function allocated to the at least one identifiable input source.

12. The computer-implemented method of claim 11 further comprising displaying, by a processor, on the display an association of the plurality of input sources with one or more displayed items of the displayed shared control panel, being indicative that each of the plurality of input sources are associated with a function represented by the one or more displayed items, in which at least one input source is associated with an identifiable input device at the surface, the association of the input source including displaying the identity of the associated input device.

13. A non-transitory computer-readable medium storing a program causing a computer to execute the method of providing an application running on the computer system; receiving, by a processor, control inputs for the application from at least two separately identifiable input sources; displaying, by a processor, a shared control panel for the application on a display of the computer system, the control panel displaying a plurality of functions for allocation to inputs to the application; receiving, by a processor, an input at the application from at least one of the identifiable input sources; detecting, by a processor, selection of a function of the control panel by the input; allocating, by a processor, the selected function to the at least one identifiable input source; storing, by a processor, an association of the at least one identifiable input source with the selected function; and in dependence on receiving a further input from the at least one identifiable input source, applying, by a processor, the stored function allocated to the at least one identifiable input source.

14. A non-transitory computer-readable medium storing a program causing a computer to execute the method of providing an application running on the computer system; receiving, by a processor, control inputs for the application from at least two separately identifiable input sources; displaying, by a processor, a shared control panel for the application on a display of the computer system, the control panel displaying a plurality of functions for allocation to inputs to the application; receiving, by a processor, an input at the application from at least one of the identifiable input sources; detecting, by a processor, selection of a function of the control panel by the input; allocating, by a processor, the selected function to the at least one identifiable input source; storing, by a processor, an association of the at least one identifiable input source with the selected function; in dependence on receiving a further input from the at least one identifiable input source, applying, by a processor, the stored function allocated to the at least one identifiable input source; and displaying, by a processor, on the display an association of the plurality of input sources with one or more displayed items of the displayed shared control panel, being indicative that each of the plurality of input sources are associated with a function represented by the one or more displayed items, in which at least one input source is associated with an identifiable input device at the surface, the association of the input source including displaying the identity of the associated input device.

* * * * *